Patented Dec. 15, 1931

1,836,685

UNITED STATES PATENT OFFICE

CHARLES J. ROMIEUX, OF ELIZABETH, NEW JERSEY, ASSIGNOR TO AMERICAN CYANAMID COMPANY, OF NEW YORK, N. Y., A CORPORATION OF MAINE

SELENIUM DI-THIO-PHOSPHATES

No Drawing. Application filed December 12, 1928. Serial No. 325,667.

This invention relates to certain selenium salts and processes of preparing the same.

Among the many compounds used in various commercial arts, it has been found that certain di-substituted organic di-thio-phosphates have valuable properties, particularly when used as rubber accelerators, flotation agents, etc. I have now discovered that the selenium salts of these di-thio-phosphates have valuable properties and may be prepared in a simple manner. These selenium compounds probably have the following structural formula:

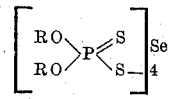

in which R represents an organic group, and more particularly where R represents an alkyl group.

The di-substituted di-thio-phosphates may be prepared in accordance with the disclosure of Romieux and Christmann application Serial No. 206,937 filed July 19, 1927. These disclosures describe preparation of soluble di-substituted di-thio-phosphates, e. g., the acids (hydrogen phosphates), the sodium salts and the like. As pointed out in Serial #206,937, the di-thio-phosphoric acids may be prepared by combining phosphorous pentasulphide with a large variety of organic compounds, particularly oxygen-containing organic compounds, either of the aromatic or of the aliphatic types and preferably containing a hydroxyl group, as, for example, by the reaction of phosphorous penta-sulphide with aliphatic alcohols such as amyl or butyl, or with aromatic hydroxy bodies such as phenol, to form the corresponding organic di-substituted di-thio-phosphoric acids. The salts of the acids are prepared by neutralizing the acid with the corresponding alkaline compound. The following is a specific example of one method of preparing the selenium salt of di-iso-propyl di-thio-phosphoric acid.

In a suitable reaction vessel, there is placed 24 parts of a well agitated 40% aqueous solution of sodium di-iso-propyyl di-thio-phoshate, preferably cooling the solution with ice or the like. To this solution there is added 1.75 parts of sodium selenite dissolved in 25 parts of water. Upon addition to this mixture, of 6.5 parts of concentrated hydrochloric acid (sp. g. 1.19) diluted with 20 parts of water, a brick-red amorphous precipitate is thrown down. This precipitate is filtered off, washed by trituration with several fresh portions of water, and is then dried over concentrated sulfuric acid. The dried product is brittle and amorphous and may be ground to a fine powder.

The reaction which takes place in the above process probably proceeds as follows:

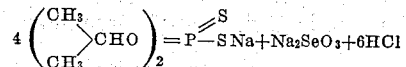

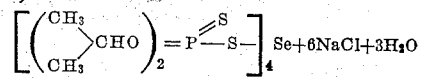

When tested as a rubber accelerator, it was found that the selenium di-iso-propyl di-thio-phosphate worked very efficiently, particularly at the higher vulcanization temperatures. Of course, it is understood that the compounds of the present invention are susceptible of many other commercial applications.

The present invention is not limited to the specific details and substances described since the organic radical in the di-substituted di-thio-phosphates may be of any suitable nature and the soluble di-thio-phosphate which is used to precipitate the selenium salt is not limited to sodium or even the alkali metal salts since those which are water soluble are of general application. Suitable changes may be made in temperatures, proportions and other features of the process without departing from the spirit and scope of the invention except as set forth in the appended claims.

I claim:

1. A compound having most probably the following structural formula:

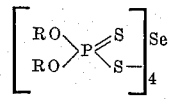

in which R represents an alkyl or aryl group.

2. A compound having most probably the following structural formula:

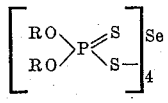

in which R represents an alkyl group.

3. Selenium di-iso-propyl di-thio-phosphate.

4. The process which comprises mixing a water soluble phosphate of the group consisting of di-alkyl and di-aryl-di-thio-phosphates with a water soluble selenite and adding an acid to the mixture to precipitate the corresponding selenium di-substituted di-thio-phosphate.

5. The process which comprises mixing a water soluble di-alkyl di-thio-phosphate with a water soluble selenite and adding a mineral acid to the mixture to precipitate the corresponding selenium di-alkyl di-thio-phosphate.

6. The process which comprises mixing a water solution of sodium di-iso-propyl di-thio-phosphate with a water solution of sodium selenite and adding hydrochloric acid to the mixture to precipitate the corresponding selenium di-iso-propyl di-thio-phosphate.

In testimony whereof, I have hereunto subscribed my name this 11th day of December, 1928.

CHARLES J. ROMIEUX.